United States Patent
Stopfer (10) Patent No.: US 11,462,978 B2
(45) Date of Patent: Oct. 4, 2022

(54) COMPACT PRODUCTION STATION FOR ASSEMBLING A STATOR FOR AN ELECTRIC MOTOR FROM STATOR SEGMENTS

(71) Applicant: Schaeffler Technologies AG & Co. KG, Herzogenaurach (DE)

(72) Inventor: Thilo Stopfer, Herogenaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/262,467

(22) PCT Filed: May 29, 2019

(86) PCT No.: PCT/DE2019/100476
§ 371 (c)(1),
(2) Date: Jan. 22, 2021

(87) PCT Pub. No.: WO2020/038515
PCT Pub. Date: Feb. 27, 2020

(65) Prior Publication Data
US 2021/0226516 A1    Jul. 22, 2021

(30) Foreign Application Priority Data

Aug. 20, 2018 (DE) ..................... 10 2018 120 235.0

(51) Int. Cl.
*H02K 15/00* (2006.01)
*H02K 15/02* (2006.01)
(Continued)

(52) U.S. Cl.
CPC ............ *H02K 15/022* (2013.01); *H02K 1/148* (2013.01); *H02K 15/026* (2013.01); *H02K 15/03* (2013.01); *Y10T 29/53143* (2015.01)

(58) Field of Classification Search
CPC .......... H02K 1/28; H02K 1/148; H02K 21/24; H02K 1/16; H02K 15/02; Y10T 29/49009;
(Continued)

(56) References Cited

U.S. PATENT DOCUMENTS 5,149,000 A      9/1992   Santandrea et al.
8,375,562 B2 *   2/2013   Endo ..................... H02K 1/187
                                                          29/596

(Continued)

FOREIGN PATENT DOCUMENTS

CN      107994690 A      5/2018
DE      102014213593 B4  11/2016

*Primary Examiner* — Thiem D Phan (57) ABSTRACT

A device for producing a stator for an electrical machine includes a segment feed for feeding stator segments, a cylindrical press for pressing the stator segments, a housing feed for feeding stator housings, and a mandrel for receiving the stator segments. The mandrel includes an axial direction, a first region with a first radius, a second region arranged axially below the first region with a second radius that is less than the first radius, and a third region arranged axially below the second region with a third radius that is less than the second radius. In an example embodiment, the mandrel is movable from the segment feed to the cylindrical press, from the cylindrical press to the housing feed, and from the housing feed to the segment feed.

16 Claims, 5 Drawing Sheets

(51) Int. Cl.
*H02K 1/14* (2006.01)
*H02K 15/03* (2006.01)

(58) Field of Classification Search
CPC ......... Y10T 29/49826; Y10T 29/53143; F16C 2380/26
USPC ...... 29/732, 564.1, 596, 606, 700, 729, 735, 29/738, 820
See application file for complete search history.

(56) References Cited

U.S. PATENT DOCUMENTS 10,468,930 B2 * 11/2019 Dawson ................ H02K 3/522
2010/0231086 A1 9/2010 Endo et al.

* cited by examiner

COMPACT PRODUCTION STATION FOR ASSEMBLING A STATOR FOR AN ELECTRIC MOTOR FROM STATOR SEGMENTS

CROSS-REFERENCE TO RELATED APPLICATIONS

This application is the United States National Phase of PCT Appln. No. PCT/DE2019/100476 filed May 29, 2019, which claims priority to German Application No. DE102018120235.0 filed Aug. 20, 2018, the entire disclosures of which are incorporated by reference herein.

TECHNICAL FIELD

The disclosure relates to a device for assembling a stator for an electrical machine from stator segments. The disclosure further relates to a method for assembling a stator for an electrical machine from stator segments.

BACKGROUND

Stators for electrical machines produced from stator segments offer advantages over conventional stators which are not produced from segments. With the segmented stators, for example, a higher copper filling factor, the use of profile wires and a high degree of utilization of the electrical steel sheet are possible.

In order to ensure adequate dimensional accuracy of the stator, the stator segments are firmly connected to one another in the provided form. Dovetails incorporated into the segments are often used for this purpose. The stator segments are pushed axially into one another, and the dovetails connect the stator segments to one another like puzzle pieces in a form-locking manner.

However, the dovetail on the stator segment results in an increased production cost of the stator segments with increased demands on the dimensional accuracy of the stator sheets. In addition, the possibility of inserting dovetails into the stator segments of smaller electrical machines diminishes due to the limited space available.

One approach to solving this problem is to press stator segments and then insert these stator segments into a housing. If the wall of the machine housing is strong enough, the segments can be pressed directly into the housing and calibrated using the press fit. However, such housings are disadvantageous in terms of weight and installation space.

DE 10 2014 213 593 B4 discloses a device and a method for producing a stator from stator segments, wherein the segments are also pressed and calibrated without a form fit. For this purpose, it discloses a press with annularly arranged press punches and a retaining mandrel, which is located radially inside the stator segments to be pressed during pressing. The pressed stator segments are held in a relatively complex manner between pressing and insertion into the housing.

SUMMARY

The present disclosure provides a device and a method that enable the stator segments to be assembled quickly and safely in a small space.

The disclosure provides a device for producing a stator for an electrical machine. The device includes a segment feed for feeding stator segments, a substantially hollow-cylindrical press for pressing the stator segments, a housing feed for feeding stator housings, and a mandrel for receiving the stator segments. The mandrel has a first region, a second region and a third region in the axial direction. The first region has a first radius which is substantially constant in the axial direction, the second region has a second radius which is substantially constant in the axial direction, and the third region has a third radius which is substantially constant in the axial direction. The first radius is greater than the second radius and the second radius is greater than the third radius.

The device according to the disclosure allows the stator segments to be received with the mandrel, and the mandrel is suitable for use in a plurality of steps during the joining of the stator segments due to its three differently designed regions. The mandrel has a main direction of extension along the longitudinal axis thereof and is substantially radially symmetrical along the longitudinal axis. The first radius may be designed in such a way that the circumference of the first region is so large that all stator segments to be joined together for a stator can be arranged next to one another in the circumferential direction on the surface of the first region.

The device has three production stations. In the context of the present disclosure, the segment feed is a first production station, the press is a second production station and the housing feed is a third production station. The first production station, the second production station and the third production station may be arranged as corner points of a substantially equilateral triangle.

In addition to the mandrel, the device may have a further mandrel and a second further mandrel. The further mandrel and the second further mandrel have all the features of the mandrel. The mandrel, the further mandrel and the second further mandrel are configured in such a way that, when the mandrel is arranged at the first production station, the further mandrel is arranged at the second production station, and the second further mandrel is arranged at the third production station. Furthermore, the mandrel, the further mandrel and the second further mandrel may be configured such that, when the mandrel is arranged at the second production station, the further mandrel is arranged at the third production station, and the second further mandrel is arranged at the first production station. Furthermore, the mandrel, the further mandrel and the second further mandrel may be configured such that, when the mandrel is arranged at the third production station, the further mandrel is arranged at the first production station, and the second further mandrel is arranged at the second production station. The mandrel, the further mandrel and the second further mandrel are thus configured in such a way that the position of one mandrel determines the position of the other mandrels and that, if a mandrel is arranged at one of the production stations, a mandrel is also arranged at the other production stations.

According to an example embodiment, the mandrel can be moved from the segment feed to the press, from the press to the housing feed and from the housing feed to the segment feed. The mandrel may be arranged on a movable mandrel arm on a tower of the device, with the tower arranged centrally between the segment feed, the press and the housing feed. This enables a space-saving implementation of the device.

The tower may be a rotating tower. The device may have a movable further mandrel arm and a movable second further mandrel arm, with the further mandrel attached to the further mandrel arm on the tower and the second further mandrel attached to the second further mandrel arm on the tower. The mandrel arm, the further mandrel arm and the second further mandrel arm may be arranged at an angle to one another with respect to the horizontal. The angle between the mandrel arm and the further mandrel arm may be 120° and the angle between the further mandrel arm and the second further mandrel arm may be 120°.

The mandrel arm may have a drive for moving the mandrel arm along the main direction of extension of the tower. The further mandrel arm may have a further drive for moving the further mandrel arm along the main direction of extension of the tower, and the second further mandrel arm may have a second further drive for moving the second further mandrel arm along the main direction of extension of the tower.

According to a further embodiment, the mandrel may have an axial drive for rotating about the longitudinal axis thereof. The mandrel may have a tilt drive for rotating about a rotational axis arranged orthogonally to the longitudinal axis, and the mandrel may be movable parallel to the main direction of extension of the tower. This enables good adaptability of the mandrel to the position of the supplied stator segments, the second production station and the third production station, and thus an exact and simple receiving and further processing of the stator segments. The mandrel may be moved parallel to the main extension plane of the tower by moving the mandrel arm.

According to a further embodiment, the first region may be configured for receiving the stator segments in the segment feed, and for feeding the received stator segments to the press. The third region may be configured in the press for avoiding excessive pressing of the stator segments during the pressing of the stator segments, and the second region may be configured for receiving the stator segments in the press after pressing, and for feeding the pressed stator segments into the housing feed. The first region may have a first electromagnet and/or a surface structure configured as an alignment contour, for example, for aligning the stator segments on the first region. The second region may have a second electromagnet. This makes it possible to use the mandrel as a tool and means of transport in or between the production stations.

The diameter of the third region may be smaller than the inner diameter of the stator to be produced. The diameter of the second region may correspond approximately to the diameter of the stator to be produced. The alignment contour may be configured in such a way that the stator segments fed to the first region are aligned at the same intervals and are parallel to one another on the surface of the first region. The surface of the first region may have depressions or ribs for this purpose, into which the segments loosely engage.

According to a further embodiment, the third region has a measuring device for detecting an electrical contact between the surface of the third region and the press. This enables the pressing in the press to be stopped in good time. For this purpose, electrical contact is established between the press and the third region via the stator sheets of the stator segments. A current flowing between the press and the third region may be measured. If a current flows between the press and the third region, the stator segments are pressed in such a way that the inner diameter of the hollow cylinder formed from the pressed stator segments is smaller than the inner diameter of the stator to be produced. The diameter of the third region may be designed such that the inner diameter of the hollow cylinder formed from the pressed stator segments expands to the desired inner diameter of the stator to be produced after pressing due to the elasticity of the stator segments.

The present disclosure also includes a method for producing a stator for an electrical machine from stator segments with the device described above. In a first step, the stator segments are received in the segment feed from the first region of the mandrel, arranged substantially in the shape of a hollow cylinder on the surface of the first region and are fed to the press.

In a second step, the stator segments are pressed in the press in the shape of a hollow cylinder, and the third region is arranged in the press during the pressing in such a way that overpressing of the stator segments is prevented by the third region. The stator segments are arranged on the surface of the second region after pressing and are fed to the housing feed.

In a third step, a housing is fed to the housing feed. The housing is heated in the housing feed, and the stator segments are arranged in the housing by means of the mandrel. This allows the stator segments to be brought together in a small installation space with a mandrel which can be used in or between a plurality of production stations as a tool or a means of transport. Furthermore, the method is flexible with regard to changing the size of the stator. In order to change the size of the stators assembled with the device and the method, it is only necessary to replace the mandrel and make changes to the press, for example by changing the pressing tools.

The stator segments may be fed to the device as separate wound stator teeth or as a completely wound series of segments wound in series. The stator segments may be fed to the device in a substantially horizontal plane.

During the first step, the second step may be carried out with the further mandrel and further stator segments, and during the first step, the third step may be carried out with the second further mandrel and second further stator segments. For this purpose, the third step may be carried out with the further mandrel and further stator segments during the second step, and that the first step may be carried out with the second further mandrel and second further stator segments during the second step. Furthermore, the first step may be carried out with the further mandrel and further stator segments during the third step, and the second step may be carried out with the second further mandrel and second further stator segments during the third step. For this purpose, the first step, the second step and the third step may be carried out in such a way that the same period of time is required for carrying out the first step, the second step and the third step.

After the stator segments have been fed into the press, the mandrel can move in such a way that the third region is arranged in the interior of the hollow cylinder formed by the stator segments. In the first step, the stator segments can be roughly arranged on the surface of the first region. By means of pressing in the second step, the stator segments can be aligned and the shape of the hollow cylinder can be calibrated. The third region can act as a contact surface, which prevents the stator segments from being overpressed too much. After pressing, the press can be released and the hollow cylinder can relax elastically. The inner diameter of the hollow cylinder can thus increase to a nominal dimension which corresponds to the inner diameter of the stator to be produced.

The stator segments can then be fed to the housing feed. A housing, which is heated, can be fed to the housing feed. The heating can be carried out inductively, for example. The mandrel can then be moved into the housing with the stator segments arranged on the second region, where the stator segments can be fixed by means of a thermal joining bond, press bond or adhesive bond. After fixing, the mandrel can be moved out of the housing again without the stator segments.

According to a further embodiment, in the first step, the mandrel is rotated about the longitudinal axis thereof for arranging the stator segments on the surface of the first region and, at the same time, the stator segments are fed to the mandrel. The stator segments are wound onto the first region, and aligned by the alignment contour of the first region during winding. This enables the stator segments to be received skillfully, simply and safely. The stator segments may be aligned with an alignment contour on the surface of the first region.

According to a further embodiment, in the first step, the stator segments are held on the first region by the first electromagnet during receiving, during feeding to the press and/or in the second step, the stator segments are held on the second region by the second electromagnet during feeding to the housing feed and/or, in the third step, the stator segments are held on the second region by the second electromagnet step during arranging in the housing, the second electromagnet is switched off after the arrangement, and the mandrel is moved away from the stator segments. This takes advantage of the good magnetic properties of the stator segments. In addition to the pressing, the stator segments may be aligned by the second electromagnet in the second step when the stator segments are fed into the housing feed.

According to a further embodiment, in the second step, the stator segments are pressed by the press to form a hollow cylinder. The press exerts a radial pressure on the stator segments for pressing, and the exertion of the radial pressure on the stator segments is terminated when an electrical contact between the third region and the press is detected. After pressing, pressing tools of the press are spaced apart from the stator segments. This ensures that the stator segments are not excessively overpressed, but rather that the pressing is terminated when the stator segments come into contact with the third region.

According to a further embodiment, in the first step, the mandrel is aligned with the longitudinal axis thereof substantially parallel to the main direction of extension of the individual stator segments and is aligned with the longitudinal axis thereof parallel to the main direction of extension of the press during feeding to the press. This enables the stator segments to be fed horizontally, for example on a conveyor belt, while the pressing and insertion of the stator segments into the housing can take place in a vertical orientation that is advantageous for these processes.

BRIEF DESCRIPTION OF THE DRAWINGS

Further details and advantages of the disclosure will be explained below with reference to the exemplary embodiment shown in the drawings. In the figures.

DETAILED DESCRIPTION

Figure 1:
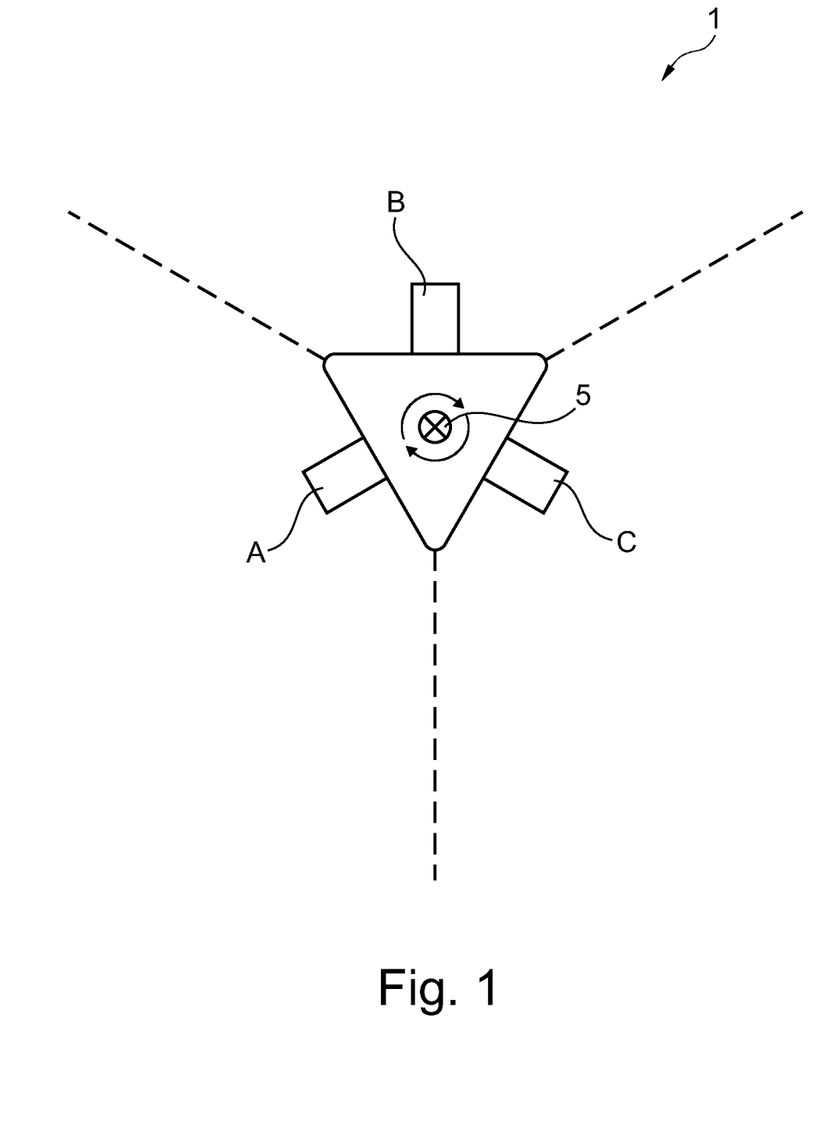
FIG. 1 schematically shows an exemplary embodiment of a device according to the disclosure for producing a stator.

In FIG. 1, an exemplary embodiment of a device 1 according to the disclosure for producing a stator is shown schematically. The device 1 has a segment feed A, a press B and a housing feed C. The segment feed A, the press B and the housing feed C are arranged around a tower 5 and form an equilateral triangle. The tower 5 is designed as a rotating tower.

Figure 2:
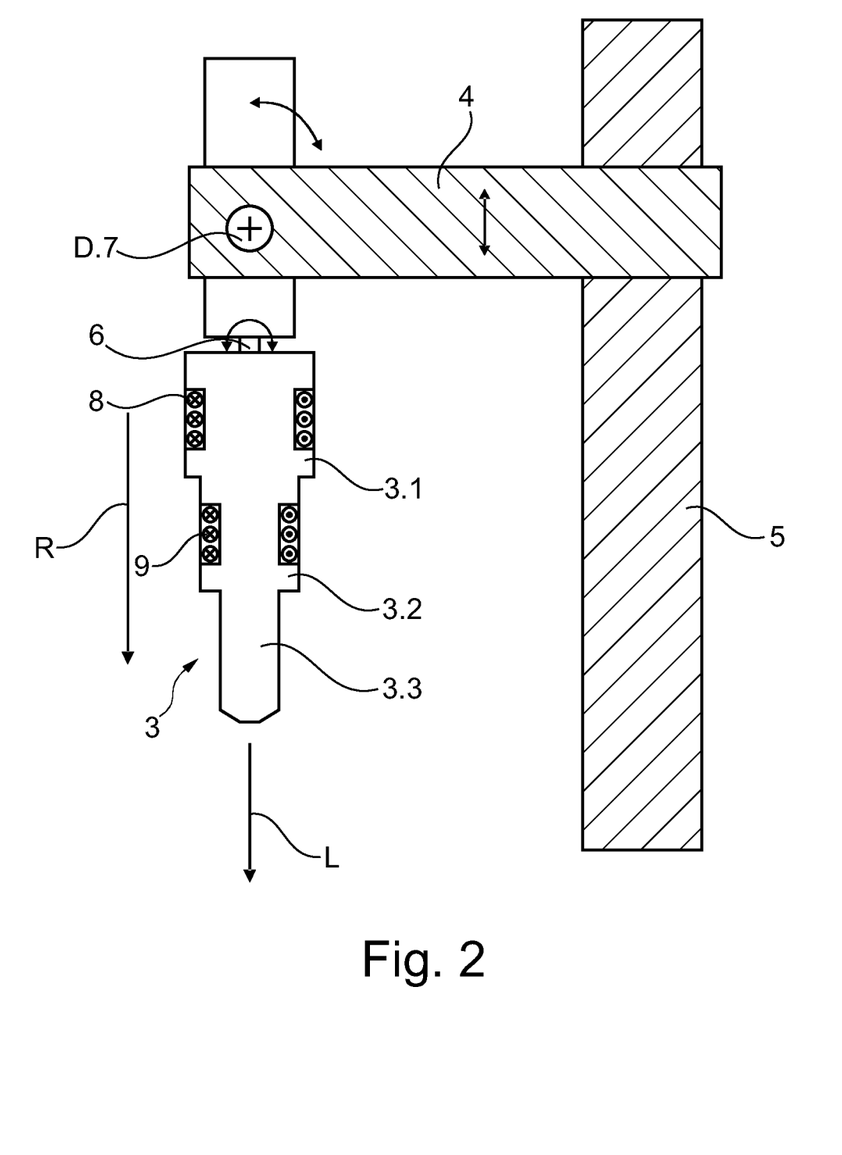
FIG. 2 schematically shows a mandrel of a device for producing a stator according to an exemplary embodiment of the present disclosure.

In FIG. 2, a mandrel 3 of the device 1 for producing a stator according to an exemplary embodiment of the present disclosure is shown schematically. The mandrel 3 is fastened to the tower 5 by a mandrel arm 4 and is rotatably mounted on a connection to the mandrel arm 4 about a rotational axis D with a tilt drive 7. The mandrel 3 can also be rotated about the longitudinal axis L thereof with an axial drive 6. In the radial direction R, the mandrel 3 has three different regions. A first region 3.1 of the mandrel has a first radius, a second region 3.2 of the mandrel 3 has a second radius which is smaller than the first radius. A third region 3.3 of the mandrel 3 has a third radius, which in turn is smaller than the second radius. A first electromagnet 8 is arranged in the first region 3.1, and a second electromagnet 9 is arranged in the second region 3.2. The third region 3.3 does not have an electromagnet.

Figure 3:
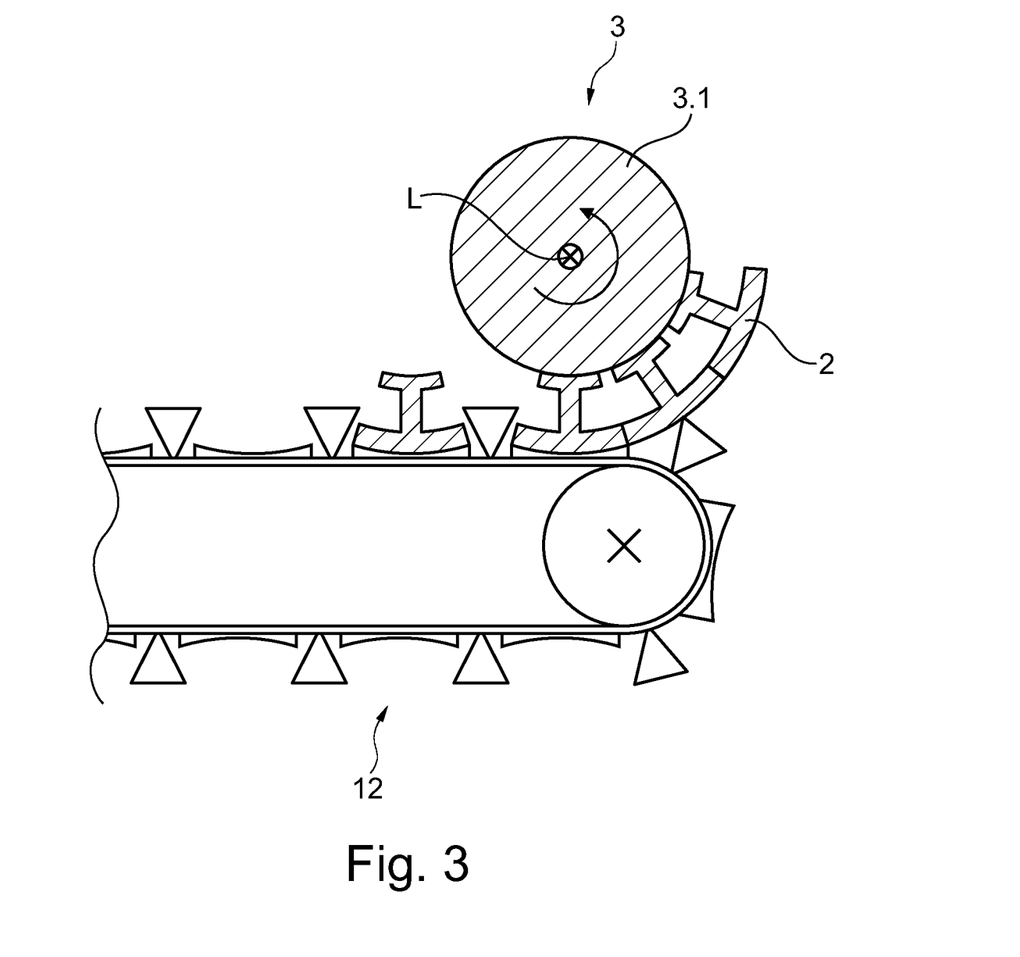
FIG. 3 schematically shows a part of the first step of the method for manufacturing a stator according to an exemplary embodiment of the present disclosure.

In FIG. 3, a part of the first step 100 of the method for manufacturing a stator according to an exemplary embodiment of the present disclosure is shown schematically. The mandrel 3 is aligned here with the longitudinal axis L thereof parallel to the main direction of extension of a plurality of stator segments 2, which are fed to the mandrel 3 by a conveyor belt 12 and wound by the first region 3.1 of the mandrel 3. For this purpose, the mandrel 3 rotates about longitudinal axis L thereof. The first electromagnet (not shown for the sake of clarity, see FIG. 2) attracts the stator segments 2 and holds them on the surface of the first region 3.1.

Figure 4:
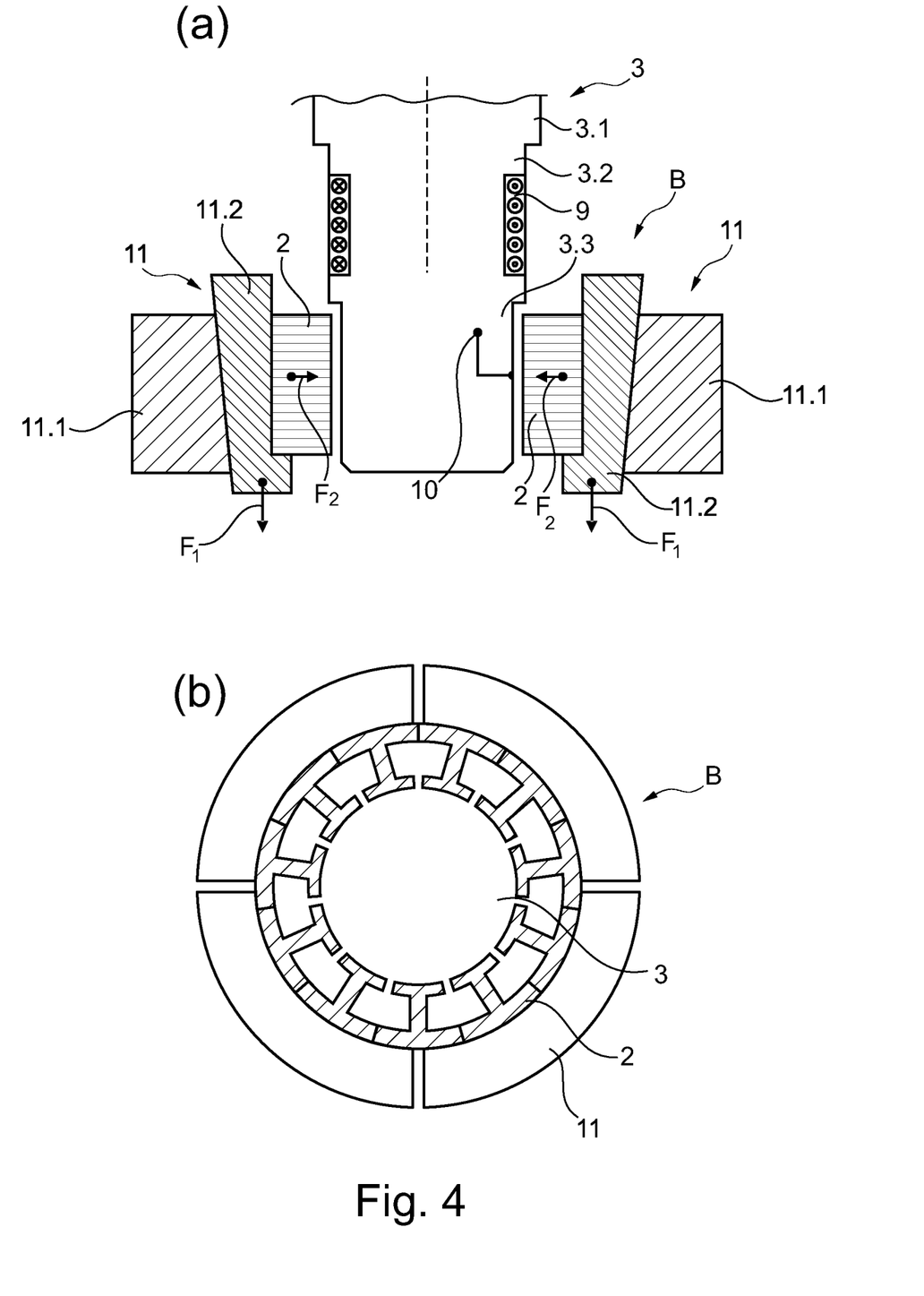
FIG. 4 schematically shows a part of the second step of the method for manufacturing a stator according to an exemplary embodiment of the present disclosure.

In FIG. 4, a part of the second step 200 of the method for manufacturing a stator according to an exemplary embodiment of the present disclosure is shown schematically. FIG. 4 (a) shows a section through the press B with the stator segments 2 and the mandrel 3. The stator segments 2 are arranged inside the press B and are enclosed by a pressing tool 11. The pressing tool 11 has a static pressing tool part 11.1 and a movable pressing tool part 11.2. The movable pressing tool part 11.2 is pressed down with an axial force $F_1$. Because the movable pressing tool part 11.2 touches the static pressing tool part 11.1 on a contact surface which is inclined relative to the radial force $F_1$, and which is inclined in the direction of the stator segments 2, the downward movement caused by the radial force $F_1$ simultaneously leads to an axial force $F_2$ in the direction of the stator segments 2, which are pressed by the axial force $F_2$.

The stator segments 2 enclose the third region 3.3 of the mandrel 3. If the stator segments 2 are pressed, they move in the direction of the third region 3.3. As soon as the stator segments 2 come into contact with the third region 3.3, a measuring device 10 registers a current flow between the press B, more precisely between the pressing tool 11 and the third region 3.3. As soon as a current is measured by the measuring device 10, the press B switches off the axial force $F_1$ and thus also the radial force $F_2$ and moves the pressing tool 11 back from the stator segments 2. The pressed stator segments 2 relax and the inner diameter of the hollow cylinder formed by the stator segments 2 increases to the nominal size of the inner diameter of the stator to be manufactured. FIG. 4 (b) shows a further section in a plan view of the press B with the stator segments 2 and the mandrel 3. The pressing tool 11 encloses the stator segments 2 and the third region of the mandrel 3.

Figure 5:
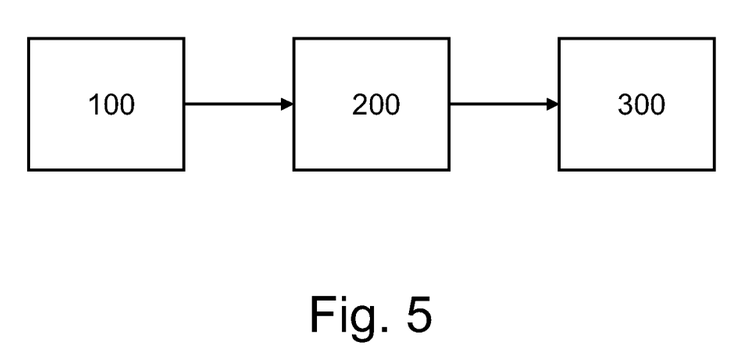
FIG. 5 schematically shows the method for manufacturing a stator according to an exemplary embodiment of the present disclosure.

The method for producing a stator according to an exemplary embodiment of the present disclosure is shown schematically in FIG. 5. In the first step 100, the stator segments 2 are received from the first region 3.1 of the mandrel 3 (see FIG. 3) and transported to the press B. In the second step 200, the stator segments 2 are pressed in the press B (see FIG. 4). The third region 3.3 of the mandrel 3 prevents the stator segments 2 from being overpressed too much. The stator segments 2 are then transported to the housing feed C. There, in the third step 300, a housing is supplied and heated. The mandrel 3 then introduces the pressed stator segments 2 into the housing.

REFERENCE NUMERALS

1 Device
2 Stator segment
3 Mandrel
3.1 First region
3.2 Second region
3.3 Third region
4 Mandrel arm
5 Tower
6 Axial drive
7 Tilt drive
8 First electromagnet
9 Second electromagnet
10 Measuring device
11 Pressing tool
11.1 Static pressing tool part
11.2 Movable pressing tool part
12 Conveyor belt
100 First step
200 Second step
300 Third step
A Segment feed
B Press
C Housing feed
D Rotational axis
L Longitudinal axis
R Axial direction
$F_1$ Axial force
$F_2$ Radial force

The invention claimed is:

1. A device for producing a stator for an electrical machine, comprising:
a segment feed for feeding stator segments;
a cylindrical press for pressing the stator segments;
a housing feed for feeding stator housings;
a mandrel for receiving the stator segments, comprising:
an axial direction;
a first region comprising a first radius;
a second region arranged axially below the first region, the second region comprising a second radius that is less than the first radius; and
a third region arranged axially below the second region, the third region comprising a third radius that is less than the second radius.

2. The device of claim 1 wherein the mandrel is movable:
from the segment feed to the cylindrical press; from the cylindrical press to the housing feed; and
from the housing feed to the segment feed.

3. The device of claim 2 further comprising:
a tower arranged centrally between the segment feed, the cylindrical press, and the housing feed; and
a movable mandrel arm arranged on the tower.

4. The device of claim 3, wherein the mandrel further comprises:
a longitudinal axis; and
an axial drive for rotating about the longitudinal axis.

5. The device of claim 4, wherein the mandrel further comprises:
a rotational axis arranged orthogonal to the longitudinal axis; and
a tilt drive for rotating about the rotational axis.

6. The device of claim 5 wherein:
the tower comprises a main direction of extension; and
the mandrel is movable parallel to the main direction of extension.

7. The device of claim 1, wherein:
the first region is configured for:
receiving the stator segments in the segment feed; and
feeding the stator segments to the cylindrical press;
the second region is configured for:
receiving the stator segments in the cylindrical press after pressing; and
feeding the stator segments to the housing feed; and
the third region is configured for avoiding excessive pressing of the stator segments in the cylindrical press.

8. The device of claim 7 wherein:
the first region has a first electromagnet, or a surface structure, configured as an alignment contour for aligning the stator segments on the first region; and
the second region has a second electromagnet.

9. The device of claim 1, wherein the third region comprises a measuring device for detecting an electrical contact between a surface of the third region and the cylindrical press.

10. A method for manufacturing a stator for an electrical machine from stator segments using the device of claim 1, comprising:
a first step comprising:
receiving the stator segments in the segment feed from the first region;
arranging the stator segments in a cylindrical shape on a first surface of the first region;
feeding the stator segments to the cylindrical press;
a second step comprising:
pressing the stator segments in a cylindrical shape with the cylindrical press;
arranging the third region in the cylindrical press to prevent an overpressing of the stator segments;
arranging the stator segments on a second surface of the second region after pressing; and
feeding the stator segments to the housing feed; and
a third step comprising:
feeding a housing to the housing feed;
heating the housing in the housing feed; and
arranging the stator segments in the housing using the mandrel.

11. The method of claim 10 wherein:
the mandrel comprises a longitudinal axis; and
the first step further comprises:
rotating the mandrel about the longitudinal axis;
arranging the stator segments on the first surface;
feeding the stator segments to the mandrel; and
winding the stator segments onto the first region.

12. The method of claim 11 wherein the first step further comprises aligning the stator segments with an alignment contour of the first region during winding.

13. The method of claim 10, wherein:
the first step further comprises holding the stator segments on the first region by a first electromagnet during the receiving the stator segments and the feeding the stator segments to the cylindrical press;
the second step further comprises holding the stator segments on the second region by a second electromagnet during the feeding to the housing feed; or
the third step further comprises:
holding the stator segments on the second region by the second electromagnet during the arranging in the housing;
releasing the stator segments by switching off the second electromagnet after the arranging in the housing; and
moving the mandrel away from the stator segments.

14. The method of claim 10 wherein:
the second step further comprises:
pressing the stator segments by the cylindrical press to form a cylinder;
exerting a radial force on the stator segments with the cylindrical press; and
terminating the radial force on the stator segments when an electrical contact between the third region and the cylindrical press is detected.

15. The method of claim 14 wherein the second step further comprises spacing a pressing tool of the cylindrical press apart from the stator segments after the pressing the stator segments.

16. The method of claim 10, wherein:
the mandrel comprises a longitudinal axis;
the stator segments comprises a first main direction of extension;
the cylindrical press comprises a second main direction of extension; and
the first step further comprises:
aligning the longitudinal axis parallel to the first main direction of extension; and
aligning the longitudinal axis parallel to the second main direction of extension during the feeding to the cylindrical press.

* * * * *